March 27, 1934.  H. H. LINN  1,953,052
TRAILER CONSTRUCTION
Filed Feb. 14, 1931   3 Sheets-Sheet 1
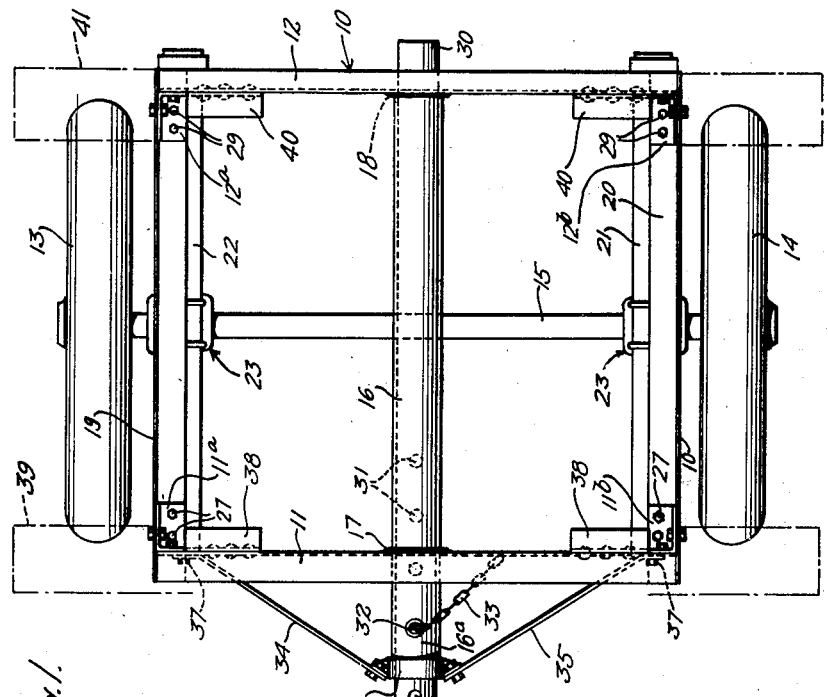
Fig.1.
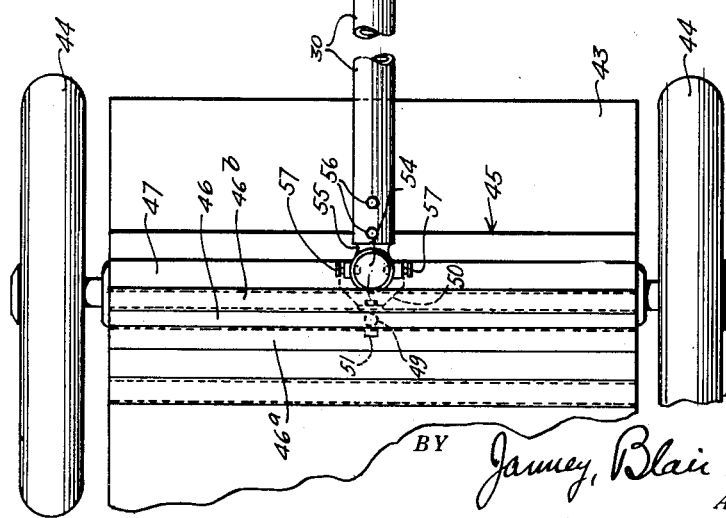
Holman H. Linn
INVENTOR
BY Janney, Blair & Curtis
ATTORNEYS March 27, 1934.  H. H. LINN  1,953,052
TRAILER CONSTRUCTION
Filed Feb. 14, 1931   3 Sheets-Sheet 3
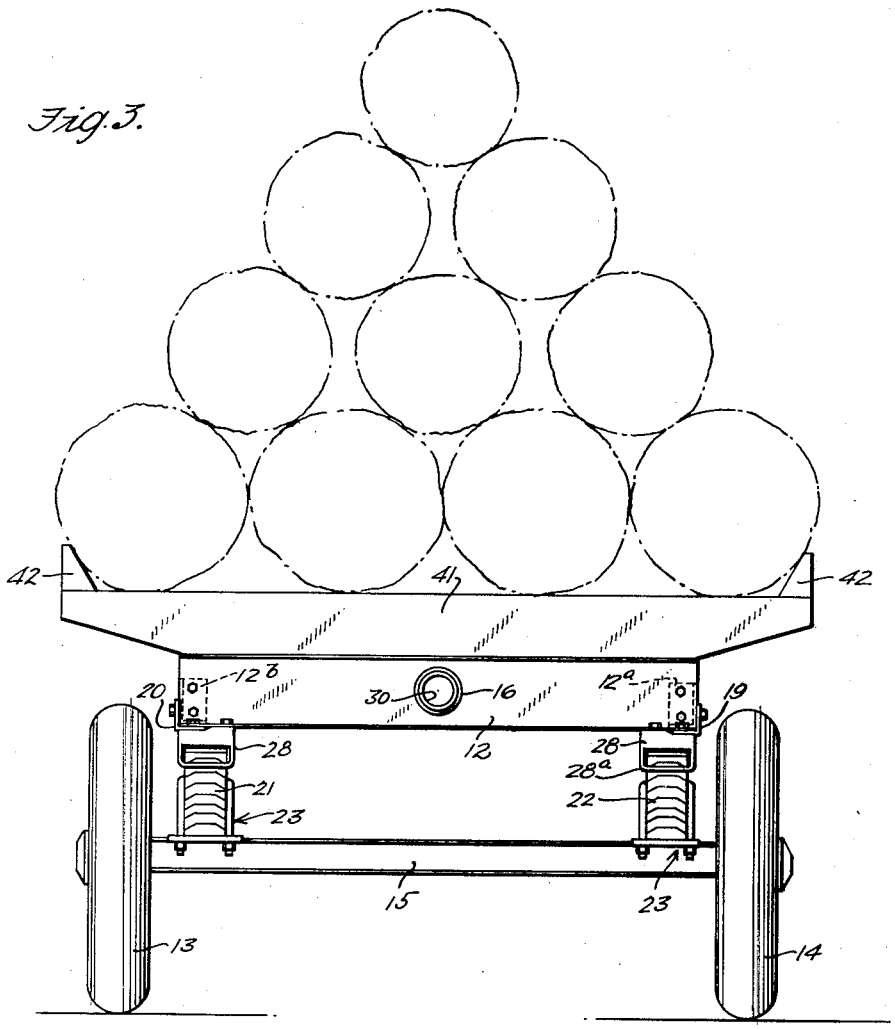
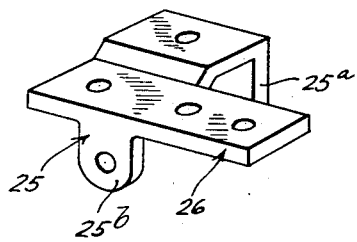
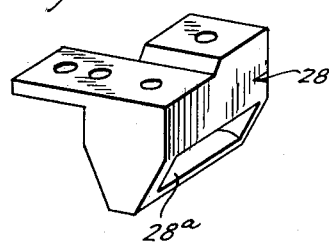
Holman H. Linn
INVENTOR
BY Janney, Blair & Curtis
ATTORNEYS Patented Mar. 27, 1934

1,953,052

UNITED STATES PATENT OFFICE 1,953,052

TRAILER CONSTRUCTION

Holman H. Linn, Morris, N. Y., assignor to Linn Trailer Corporation, Oneonta, N. Y., a corporation of New York Application February 14, 1931, Serial No. 515,696

6 Claims. (Cl. 280—33.4)

This invention relates to trailer construction.

One of the objects of this invention is to provide a thoroughly practical and rugged trailer construction that will be of dependable and efficient action in practical use. Another object is to provide a construction of the above mentioned character that will be strong, light and inexpensive, but well adapted to meet the severe and varying conditions of hard practical use. Another object is to provide a vehicle frame construction that will be of few parts, that may be readily and inexpensively assembled, and that will stand up well under severe load and road conditions. Another object is to provide a trailer construction adapted particularly for hauling long and unwieldy objects like logs or poles or pipes and that will fully and dependably meet the peculiar conditions met with in the hauling or transportation of such objects. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings, in which is shown one of various possible embodiments of my invention, Figure 1 is a plan view of a trailer with its associated coupling to a hauling vehicle;

Figure 3 is an end elevation as seen from the right in either Figures 1 or 2;

Figure 4 is an enlarged end view of a bracket for securing the leaf springs to the vehicle frame; and Figure 5 is a similar enlarged end view of a bracket for holding certain other portions of the leaf springs in assembled relation with respect to the vehicle frame.

Similar reference characters refer to similar parts throughout the several views of the drawings.

Figure 2:
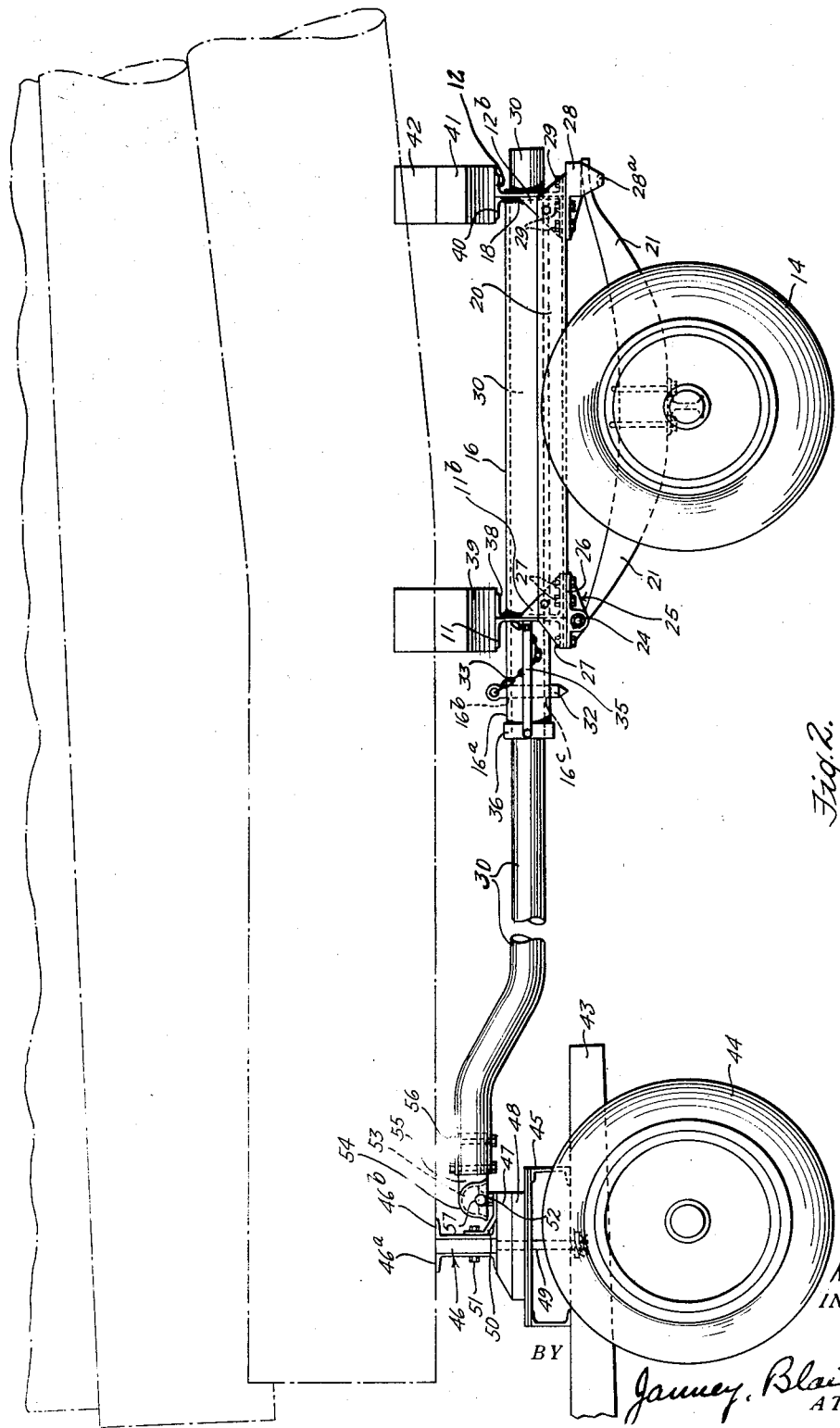
Figure 2 is a side elevation thereof, portions of a typical load being indicated in dotted lines.

Referring now more particularly to Figure 1, I have shown a vehicle frame, generally indicated at 10, made up of a front or forward cross beam 11 and a rear cross beam 12, both preferably of channel cross sectioned structural steel, these members being preferably of a length less than the standard spacing of supporting wheels 13 and 14 rotatably carried in any suitable manner by an axle 15; extending centrally of the cross beams 11 and 12, which are preferably of relatively heavy construction, and joined thereto, is a tubular member 16 preferably of relatively large diameter and preferably made of steel, having therefore, great resistance to bending and great resistance to twisting about its axis. The channel cross beams 11 and 12 are preferably arranged so that the flanges thereof face outwardly or away from the vehicle frame and the tubular member 16 is rigidly secured to the main webs of the channel members 11 and 12, preferably by welding, as is indicated at 17 and 18 (Figure 1), the welding preferably extending about the entire periphery of the tubular member 16. The diameter of the tube member 16 preferably closely approaches the depth of the structural steel cross beams 11 and 12, as appears better in Figure 2. The tubular member 16 extends forwardly (to the left as viewed in Figures 1 and 2) through a suitable opening in the vertical web of the front channel member 11, this extended portion being indicated at 16a.

Extending parallel to this central tube member 16 and connecting the ends of the cross beams 11 and 12 are two side frame members 19—20 preferably of angle section, as appears better from Figure 3, and preferably much lighter than the relatively heavy cross beams 11 and 12. The angle members 19 and 20 overlap the ends and bottom faces of the lower webs of the cross beams 11 and 12, the latter being in effect seated within the angle formed by the vertical and horizontal webs of the steel angle members 19 and 20.

A possible proportion of the dimensions of the longitudinal frame members 19—20 with respect to the cross beams 11 and 12 is clearly indicated in Figures 2 and 3. Members 19 and 20, though of a suitable cross section to function in adequate respects as compression members, function mainly, as will be more clearly pointed out hereinafter, as tension members. The side angle members 19 and 20 are secured to the cross members 11 and 12 in any suitable manner, as by rivets or welding or bolts.

Considering now how the frame 10 is supported by the axle 15, reference may first be made to Figures 2 and 3 in which I have shown heavy stacked leaf springs 21 and 22 secured or clamped by any suitable means, generally indicated at 23, to the axle 15 at such points that the leaf springs 21 and 23, substantially underlie the side frame members 20 and 19 respectively; the leaf springs are of sufficient length to extend substantially from one cross beam to the other, as is better shown in Figure 2.

The forward ends of the leaf springs 21 and 22 are pivotally secured by bolts 24 carried in suitably spaced ears provided in brackets 25, the brackets having a face plate portion 26 adapted to be seated against the under face of the horizontal web of the side frame members 19—20 and also against the under face of the lower flange of the forward channel cross beam 11.

The above described relation and construction of the spring supporting brackets 25 is better shown in the enlarged end view of Figure 4. The brackets 26 are secured in position by means of bolts 27 that pass through the face plate portion 26 and the horizontal flanges of the frame members 11, 19 and 20. The brackets 26 with their securing bolts 27 thus function also to form a rigid connection of the side frame members 19 and 20 to the forward cross beam 11.

Substantially similar brackets 28 (see Figures 2, 3 and 5) are secured against the under faces of the horizontal flanges of the side members 19 and 20 and the rear cross beam 12, the bolts 29 securing these parts together, the rear ends of the leaf springs 21 and 22 are connected in any suitable manner to the brackets 28 so as to permit relative movement between the rear ends of these springs and the brackets. A preferred form of connection is such that the rear ends of the leaf springs 21 and 22 are slidably received within a loop-shaped portion 28a of the brackets 28. This relation of the parts is clearly shown in Figures 2 and 3.

The central tubular torsion-member 16 is open ended at both ends, and snugly and slidably received therein is what may be termed a pole 30 (Figures 1, 2 and 3) preferably made of steel tubing; at its forward end, the pole 30 is provided with means for connecting it to the hauling vehicle, as will be more clearly described hereinafter. At a portion intermediate of its ends, pole tube 30 is provided with juxtaposed openings 31 suitably spaced throughout a substantial intermediate portion thereof, and in Figure 1 I have illustratively shown seven such openings. The forwardly extended portion 16a of the torque tube 16 (see Figures 1 and 2) is provided with similarly diametrically opposed openings 16b and 16c so that, upon registering any of the openings 31 in the pole tube 30 with the openings 16b and 16c of the torque tube section 16a, a pin 32 may be passed therethrough, thus to hold the pole tube 30 against axial or rotary movement with respect to the tube 16. By this construction the length of the exposed portion of the torque tube 30 may be varied at will to suit the length of the articles to be transported, all as will be more clearly described hereinafter, the rearmost opening 31 in the pole tube 30 being at such a distance from the rearmost end of the tube 30 that even when the latter is extended out of the tube 16 to its maximum amount there will remain a substantial end portion of pole tube 30 snugly seated within the torque tube 16 so that the pole tube 30 continues dependably and reliably to control the movements of the trailer vehicle proper. The locking pin 32 is preferably connected to the vehicle frame 10 by means of a suitable length of chain 33.

Preferably also the extended portion 16a of the torque tube is braced against side strains by means of tension members 34 and 35 secured at their forward ends to an appropriate ring-like member 36 rigidly connected, as by welding, to the front end of the tube 16, and secured at their rear ends by bolts 37 to the vertical web of the front cross beam 11.

As is better shown in Figure 1, suitably shaped and preferably flanged and ribbed braces, indicated at 11a, 11b, 12a and 12b are fitted into the corners where the cross beams 11 and 12 and the side frame members 19 and 20 intersect or abut, these braces being secured to the frame members in any suitable manner, as by rivets or bolts. They also facilitate the connection of the frame members one to the other and, as better appears from Figure 2, portions of these braces are of sufficient height to assist in maintaining the cross beams 11 and 12 against tilting.

Relatively short sections of angle iron indicated at 38 are riveted or bolted to the inwardly directed face of the vertical web of the channel cross beam 11, the plane of the upper faces of the horizontal webs of the angle sections 38 being in the same plane with the upper face of the upper horizontal web of the cross beam 11. Thus the upper surface of the cross member 11 is extended rearwardly to provide an ample bearing surface for receiving a bolster 39 made of any suitable material; the bolster 39 may take the form of a heavy wooden cross beam that extends, as is better shown in Figure 1, beyond the sides of the frame 10 and it may extend even beyond the wheels 13 and 14.

Similar angle sections 40 (see Figures 1 and 2) are secured to the inwardly directed face of the vertical web of rear cross beam 12, and supported by these parts is a rear bolster 41 of a shape and construction similar to the bolster 39. Bolsters 39 and 40 may be provided with stakes or chock blocks 42 at their outer ends and these stakes may be shaped as is shown in Figure 3. The bolsters 39 and 40 are rigidly secured in position as by suitable bolts extending through the upper horizontal flanges of the cross beams 11—12 or of the angle members 38 and 40, or both.

In Figure 2 is shown the rear end portion of a possible form which the hauling vehicle may take; the rear end portion of the frame of the hauling vehicle is indicated at 43, being supported by a suitable rear axle and wheels generally indicated at 44. Secured to the frame 43 is a pedestal or bunk 45 of suitable height and this pedestal may be built up of structural steel sections, extending preferably crosswise of the frame 43, as is better shown in Figure 1.

Upon the pedestal 45 is pivotally mounted a bolster 46 of dimensions commensurate with those of bolsters 39 and 41. Bolster 46 may be made of any suitable material and may, for example, comprise two cross beams 46a and 46b of channel cross section suitably secured together. Preferably the bolster 46 is rigidly secured to a turntable 47 adapted to rest upon a suitable plate-like member 48 carried by the bolster 45, a king-pin 49 extending through these parts so as to permit bolster 46 with turntable 47 to rotate or swing about the king-pin or kingbolt 49, parts 47—48 insuring adequate bearing surfaces and acting also to distribute the load to the pedestal 45.

At a central point in the bolster 46 is secured a bracket 50 (Figures 2 and 1), as by the bolt 51, the bracket 50 having a horizontal portion resting against the turntable 47 to which the horizontal portion is in turn secured, as by cap screws 52. Extending upwardly from the horizontal portion of bracket 50 is a hemispherical member 53 preferably formed integrally with the bracket 50.

The member 53 is adapted to be received within the socket portion 54 of a member 55 having a tubular extension fitted into the left-hand end of the pole tube 30, being secured thereto as by bolts 56.

At the sides of the longitudinal axis of the pole 30, as viewed in Figure 1, the socket portion 54 is provided with bosses in which are slidably received locking pins 57 spring pressed inwardly and adapted to be projected underneath the knob-like member 54, thus to prevent disengagement of the pole tube 30 from the hauling vehicle 43 while providing ample range of swinging movement of the pole 30 about both the vertical axis of member 53 and a horizontal axis therethrough.

The pole tube 30 may have suitable bends therein such as are indicated in Figure 2 so as to bring the upper surfaces of bolsters 41, 39 and 46 into the same plane. Across these bolsters rests the load which may, by way of illustration, take the form of logs or poles as is indicated in dotted lines in Figure 2. The spacing of the bolsters 41 and 39 from the hauling vehicle 43 may be varied by means of the adjustable slidable connection between the pole tube 30 and the torque tube 16 to meet the particular length or lengths of logs or poles that are being transported.

In lumber transportation, particularly where the material is in the form of logs, trailer constructions are subjected to peculiar strains and stresses due not only to the varying character of the road bed met with but also to the character of the load itself. For example, logs and like timber are rarely exactly straight and oftentimes, instead of the load of logs making a uniform contact with the supporting bolsters, make contacts therewith that result in the greater concentration of load at certain points in the vehicle than in others. For example, a log that is upwardly curved and that may have a projecting part, may contact the lower left-hand portion of the forward bolster 39, as viewed in Figure 1, and not contact at all with the rear bolster 41. The logs that are stacked on top of such a log merely aggravate matters and their weight is transmitted to the trailer through the point of contact of the lowermost log with the trailer. Thus severe distortion of the trailer frame tends to take place. But, by way of my invention, the torque tube 16 rigidly connecting the heavy cross beams 11 and 12 prevents the trailer frame from being distorted and maintains the bolsters 39 and 41 in alignment with each other, thus insuring a uniform transmission of the load from the frame through the springs 21 and 22 to the wheels 13 and 14 which, by the way, may be rubber-tired if desired. Moreover, the prevention of distortion of the frame also insures proper directional following by the wheels 13—14 of the forward wheels 44—44 in that skewing of the axle 15 relative to the longitudinal axis of the frame 10 is precluded. For example, if the lower left hand corner of the frame 10, as viewed in Figure 1, were to be permitted to tilt downwardly and the upper left-hand corner of the frame 10 to tilt upwardly as a result, due, for example, to non-uniform load distribution, the axle 15 would be skewed relative to the longitudinal axis of the frame 10, wheel 14 would be positioned somewhat to the right of its present position in Figure 10, wheel 13 would be positioned somewhat to the left of its present position in Figure 1, and the vehicle would thus not properly follow the front wheels 44—44; however, the torsion-resisting tube 16, as is above made clear, prevents such skewing of the axle and thus insures proper following travel by the wheel 13—14.

The load is chained or tied in any suitable manner to the frame 10 and as the train of vehicles moves along, unevenness in the road bed can cause substantial relative up and down sway between the bolster 46 on the hauling vehicle 43 and the rigidly interconnected bolsters 41 and 39. Such action tends to exaggerate the effects above pointed out, but here again the torque tube 16 prevents distortion or twisting of the trailer frame.

Similar and sometimes very severe actions take place when the train of vehicles moves around a corner or curve, the load and trailer then pivoting about the axis of the king-pin 49 (Figure 2). But dependable action of the trailer frame 10 is insured even under these circumstances by the effect of the torsion-resisting member 16.

The torque tube 16, aside from having such important practical advantages as those pointed out above, also makes it possible for me to use side frame members 19 and 20 that are relatively light, since the torque tube 16 acts dependably to maintain the desired parallel relation between the cross beams 11 and 12.

If the load is of such a character that the bolster 46 on the hauling vehicle 43 is not employed, the load being carried by the cross beams of the trailer itself, the pivoting action of bolster 46 on the hauling vehicle need not take place, the desired articulation between the hauling vehicle and the trailer being achieved by means of the ball and socket connection 53—54.

The side frame members 19 and 20 function both by compression and tension to distribute to the cross beams 11 and 12 and to the torque tube 16 such strains as are imposed by the springs 21 and 22 particularly when one wheel of the trailer, in being moved either in a forward or backward direction, encounters an obstacle or resistance to its movement greater than is encountered by the other. In such cases one spring, such as spring 21 for example, might place side frame member 20 in tension and the other spring, such as spring 22, might place the member 19 in compression. In such case the pull exerted by the spring 21 on the lower left-hand corner of the frame 10, as viewed in Figure 1, would have also a substantial downward component (see Figure 2) tending to depress that corner of the frame 10, a depression which, if permitted, would allow axle 15 to become skewed relative to the longitudinal axis of the frame 10 in a manner analgous to that earlier above described in connection with the assumed concentration of load in the lower left-hand corner of the frame 10; but the torsion-resisting tube 16 prevents such depression or tilting downwardly of that corner of the frame 10, insuring the maintenance of the cross-members 11—12 within the same or common horizontal plane, and thus proper following travel of wheels 13—14 is insured. Or the reaction of one spring might exert a greater force on the frame 10 in the direction of the longitudinal axis of the latter than does the other spring. But under such circumstances, torque tube 16 dependably resists the tendency to throw cross beams 11 and 12 out of parallelism, side frame members 19 and 20 assisting in this action.

It will thus be seen that there has been provided in this invention a trailer construction in which the objects hereinbefore noted, together with many thoroughly practical advantages, are successfully achieved. It will be seen that the construction is of a thoroughly practical nature, can be made up of relatively few parts, that commercially available or standard structural steel sections may be employed, thus to reduce the cost, and that the construction is light but very strong and well adapted to meet the varying conditions of hard practical use.

As many possible embodiments may be made of the above invention and as many changes might be made in the embodiment set forth, it is to be understood that all matter hereinbefore set forth or shown in the accompanying drawings is to be interpreted as illustrative and not in a limiting sense.

I claim:

1. In construction of the character described, in combination, a vehicle frame including a plurality of structural steel cross members having a vertical web of substantial depth, said cross-members being longitudinally spaced and directly receiving the load to be carried by said frame, a tubular torsion-resisting member extending along the longitudinal axis of said frame and having said cross members rigidly secured thereto, said tubular member being passed through the vertical web of the foremost cross member, wheel means supporting said frame, and wheel means connected with the extended portion of said tubular member.

2. In construction of the character described, in combination, a rectangular vehicle frame including heavy cross-beams at opposite ends thereof and relatively light side members connecting said cross-beams, said cross-beams being adapted to directly supporting elongated load-forming members, such as logs, or the like, and being thereby subjected to non-uniform distribution of the load, and a torsion-resisting member positioned along the longitudinal axis of said frame and interconnecting the said cross-beams thereof to resist strains due to said non-uniform distribution of the load tending to throw said cross-beams out of parallelism.

3. In construction of the character described, in combination, a rectangular vehicle frame including heavy cross-beams, said cross-beams being adapted to directly support elongated load-forming members, such as logs, or the like, and being thereby subjected to non-uniform distribution of the load, a torsion-resisting member extending along the longitudinal axis of said frame and interconnecting said cross-beams to resist relative twisting thereof about the axis of said member due to said non-uniform distribution, and relatively light tension members connecting said cross-beams to resist relative twisting thereof about a vertical axis.

4. In construction of the character described, in combination, a substantially rectangular vehicle frame made up of at least two longitudinally spaced end transverse members, each of channel cross-section, relatively light longitudinally extending tension members for interconnecting said cross-members, and a tubular torsion-resisting member extending along the axis of the vehicle frame and welded to the vertical webs of said channel cross-members, load-supporting bolsters carried by said channel cross-members, said tubular member resisting movement of said cross-members out of parallelism and said tension members resisting bending of said cross-members about a vertical axis, wheel and axle means, and means connecting said last-mentioned means to said frame.

5. In construction of the character described, in combination, a vehicle frame including a plurality of structural steel cross-members spaced longitudinally of the frame, said cross-members being of substantial vertical dimension, a torsion-resisting member positioned along the longitudinal axis of said frame and accommodated between the planes passed respectively through the upper edges and the lower edges of said cross-members, side longitudinal members connecting the respective lateral ends of said cross-members, whereby said frame is given a rectangular shape, an axle underneath and extending transversely of said frame and having wheel means at its opposite ends, two means each connecting an end portion of the axle to said frame at a point in the latter spaced transversely from the longitudinal axis of said frame, means including wheel means spaced forwardly of said first-mentioned wheel means for coacting in supporting the load on said frame, and means rigidly connecting said cross-members to said torsion-resisting member whereby when one of the axle wheel means encounters a greater resistance to travel than the other, said torsion-resisting member prevents the resultant action through said connecting means from tilting one cross-member relative to the other and out of their common horizontal plane and thereby prevents skewing of the axle relative to the longitudinal axis of the frame and insures proper following travel of said axle wheel means.

6. In construction of the character described, in combination, a substantially rectangular vehicle frame made up of at least two longitudinally spaced end cross-members lying in the same horizontal plane and longitudinally extending transversely spaced members for interconnecting said cross-members, said members being made up of structural steel sections, a draft pole extending along the longitudinal axis of said frame and forwardly of the latter for connection to a hauling vehicle or the like, an axle extending crosswise of and underneath and spaced downwardly from said frame, said axle extending at 90° to the longitudinal axis of the frame and having wheel means at its opposite ends, two spring means, one adjacent each end of the axle, for connecting the axle to points in said frame spaced laterally of the longitudinal axis thereof, and means for preventing said axle from being skewed out of said 90° relation to the longitudinal axis of said frame when one wheel means thereon encounters greater resistance to travel than the other, said preventing means including a torsion-resisting tube rigidly connected to said spaced cross-members for preventing the forces transmitted to the latter through said spring means from tilting either of said cross-members out of said horizontal plane thereof, whereby proper following travel by said wheel means of the hauling vehicle is insured.

HOLMAN H. LINN.